(12) United States Patent
Baker et al.

(10) Patent No.: US 7,395,343 B1
(45) Date of Patent: Jul. 1, 2008

(54) NETWORK TUNNELING METHOD AND APPARATUS

(75) Inventors: Jay Baker, Raleigh, NC (US); Jeff Hewett, Cary, NC (US); Charles Thomas, Ashland, OR (US)

(73) Assignee: Cisco Technology, Inc., San Jose, CA (US)

( * ) Notice: Subject to any disclaimer, the term of this patent is extended or adjusted under 35 U.S.C. 154(b) by 722 days.

(21) Appl. No.: 10/083,891

(22) Filed: Feb. 26, 2002

(51) Int. Cl.
*G06F 15/16* (2006.01)
(52) U.S. Cl. ...................................... 709/230; 719/328
(58) Field of Classification Search ................. 709/238, 709/227–228, 230, 250; 719/328; 707/102
See application file for complete search history.

(56) References Cited

U.S. PATENT DOCUMENTS

| | | | | |
|---|---|---|---|---|
| 5,826,030 | A * | 10/1998 | Hebert | 709/228 |
| 6,088,749 | A * | 7/2000 | Hebert et al. | 710/105 |
| 6,311,238 | B1 * | 10/2001 | Hebert | 710/65 |
| 6,480,597 | B1 * | 11/2002 | Kult et al. | 379/242 |
| 6,516,355 | B1 * | 2/2003 | Hartmann et al. | 719/317 |
| 6,567,377 | B1 * | 5/2003 | Vepa et al. | 370/230 |
| 6,594,685 | B1 * | 7/2003 | Mishra et al. | 709/203 |
| 6,801,940 | B1 * | 10/2004 | Moran et al. | 709/224 |
| 2004/0015499 | A1 * | 1/2004 | Silverman et al. | 707/9 |

OTHER PUBLICATIONS

Cisco AS5350 Universal Gateway Quick Look Fact Sheet (6 pages) May 25, 2001.

* cited by examiner

*Primary Examiner*—Abdullahi Salad
(74) *Attorney, Agent, or Firm*—Stolowitz Ford Cowger LLP

(57) ABSTRACT

Method and apparatus for tunneling any existing data-, control-, or routing-related protocol through a generic Internet protocol (IP) transport are described. The method includes providing a generic messaging structure that includes at least a transport protocol, a message buffer, a source-address field and one or more data fields for transparent routing of a user protocol over the IP transport and also providing an application program interface to the generic messaging structure, the interface including a mechanism for a user to choose a desired transport and associated protocol for transparently routing the user protocol over the transport in accordance with the chosen transport protocol within the one or more data fields. Alternatively or additionally, the method includes creating a base class library including plural defined source and header files and further providing a mechanism for deriving a transaction-based protocol-specific class that is compatible with the base class library. The apparatus is an application programming interface (API), preferably coded in C/C++, for transparently routing data between sockets in such an IP transport. The API includes a message buffer data structure defining a protocol-generic parent class, message, source-address and data fields; a message creation mechanism for creating a message and adding it to the message buffer data structure; and a protocol creation mechanism for deriving a protocol-specific child class that renders new protocol-specific sub-fields of the protocol field of the message buffer data structure.

17 Claims, 3 Drawing Sheets

NETWORK TUNNELING METHOD AND APPARATUS

BACKGROUND

1. Field

This invention relates generally to tunneling methods and apparatus for transporting messages across a network interface. More particularly, it concerns an extensible application programming interface that provides access and control mechanisms for use in encapsulating any existing data-, control-, or routing-related protocol within a generic transport protocol.

2. Background

A method is needed for transporting Signaling System 7 (SS7) messages across a Unix domain protocol/internet protocol (UDP/IP) interface. The method should accommodate other "application control" messages. To this end, a new protocol is needed that can wrap any type of "existing" protocol into a packet and deliver the encapsulated packet across the interface.

SUMMARY

Method and apparatus for tunneling an existing protocol through a generic Internet protocol (IP) transport are described. The invented method includes providing a generic messaging structure that includes at least a transport protocol, a message buffer, a source-address field and one or more data fields for transparent routing of a user protocol over the IP transport and also providing an application program interface to the generic messaging structure, the interface including a mechanism for a user to choose a desired transport and associated protocol for transparently routing the user protocol over the transport in accordance with the chosen transport protocol within the one or more data fields. Alternatively or additionally, the invented method includes creating a base class library including plural defined source and header files and further providing a mechanism for deriving a transaction-based protocol-specific class that is compatible with the base class library.

The invented apparatus is an application programming interface (API), preferably coded in C/C++, for transparently routing data between sockets in such an IP transport. The API includes a message buffer data structure defining a protocol-generic parent class, message, source-address and data fields; a message creation mechanism for creating a message and adding it to the message buffer data structure; and a protocol creation mechanism for deriving a protocol-specific child class that renders new protocol-specific parameters for use within the message buffer data structure.

DETAILED DESCRIPTION OF THE EMBODIMENTS

A C/C++ application programming interface (API) is proposed that allows any existing protocol to be routed between transmission control protocol (TCP) or UDP sockets. The invented API, referred to herein as MsgBuff, consists of specialized (for SS7 purposes) headers containing such information as linked and circuit identification code (CIC). This information is then followed by between zero and any (typically large) integer number of "tag-length-value" (TLV) trios. These trios may contain any type of data. In one embodiment, these data are byte representations of SS7 ISUP message parameters. In addition, several "application control" trios are created that are specific to illustrative embodiments of the invention.

The API may be rendered, for example, on a Solaris Sparc, Solaris x86 and Windows platform. Those of skill in the art will appreciate that other platforms, within the spirit and scope of the invention, may be used.

The primary advantage to the MsgBuff API is one of extensibility and non-reliance on the encapsulated protocol. In fact, the data that are encapsulated need not be a defined protocol at all. The API allows further use by any IP or SS7 protocol. Additional protocols are supported by deriving parameter objects from a generic base object. For example, transaction-based protocols such as a session-initiated protocol (SIP), a simple gateway monitoring protocol (SCMP), etc., may be provided in accordance with, and within the spirit and scope of, the invention. Other (non-protocol) data can be used directly by using the construction method described and illustrated herein.

The invented API can be used in any IP environment where a defined protocol is needed to send any encapsulated data stream. In accordance with one embodiment of the invention, the API requires the supported C/C++ header files as well as the platform-appropriate library. Those of skill in the art will appreciate that the data are transmitted over the Internet transparent to the transport protocol. Thus, the invention may be thought of as involving novel tunneling method and apparatus.

The invention thus represents a novel tunneling protocol.

Figure 1:
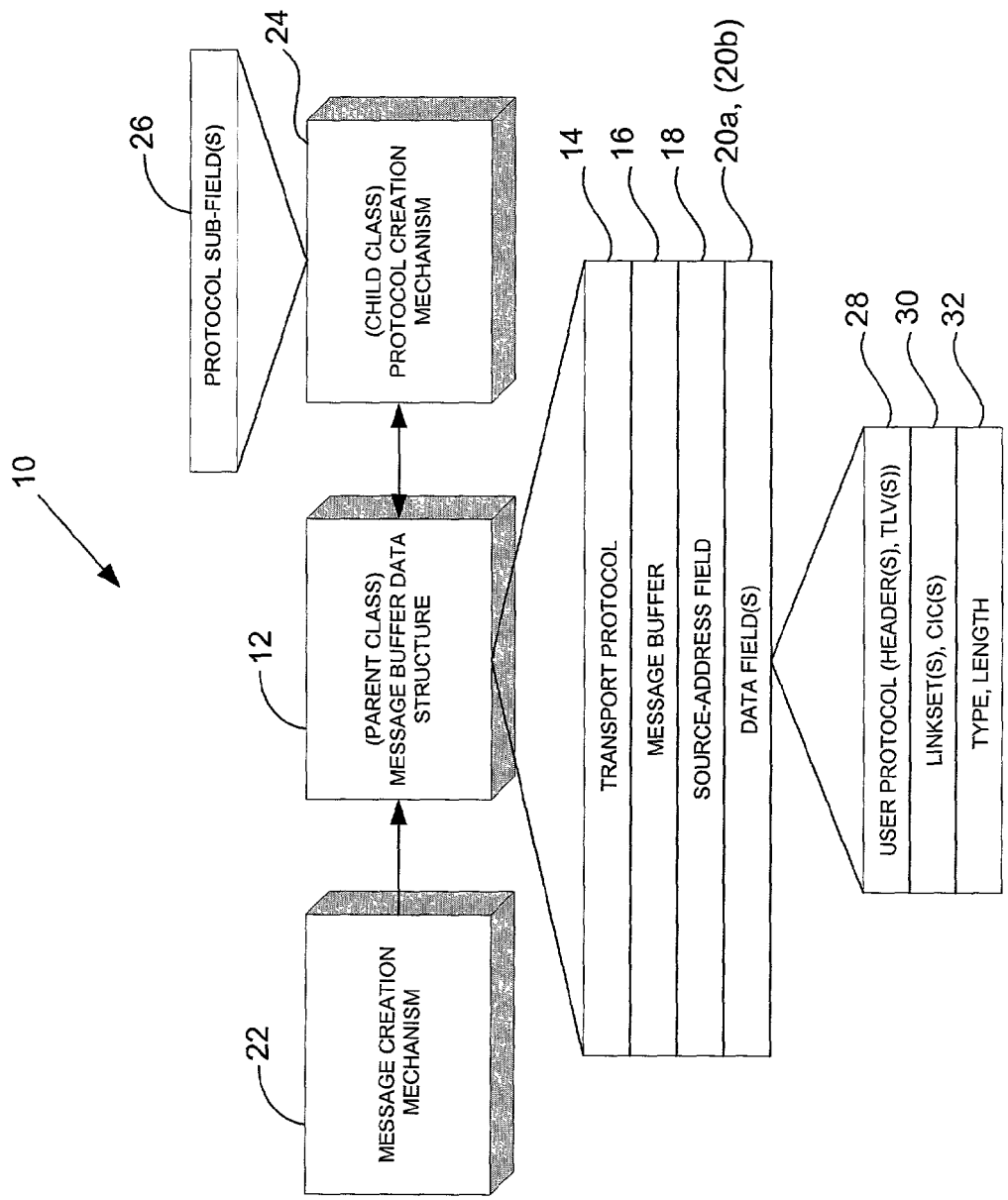
FIG. 1 is a schematic block diagram representing the invented interface in accordance with one embodiment of the invention.

FIG. 1 illustrates the invented interface in a first embodiment, in schematic block diagram form. The invention may be seen to take the form of an API 10 for routing data between transmission control protocol (TCP) of Unix domain protocol (UDP) sockets. Interface 10 includes a message buffer data structure 12 that defines a protocol-generic base or parent class data field (hereinafter, simply, protocol field) 14, a message data field 16, a source-address data field 18 and one or more data fields 20a, 20b, etc. Interface 10 also includes a message creation mechanism 22 for creating a message and adding it to message buffer data structure 12. Interface 10 includes a protocol creation mechanism 24 for deriving a protocol-specific derived or child class that renders one or more new protocol-specific sub-fields (hereinafter, simply, protocol sub-fields) 26 compatible with protocol field 14 of message buffer data structure 12. In accordance with one embodiment of the invention, data within data fields 20a, 20b may represent one or more headers and TLV byte triplets 28, one or more linksets and CICs 30, and message type and length 32.

Figure 2:
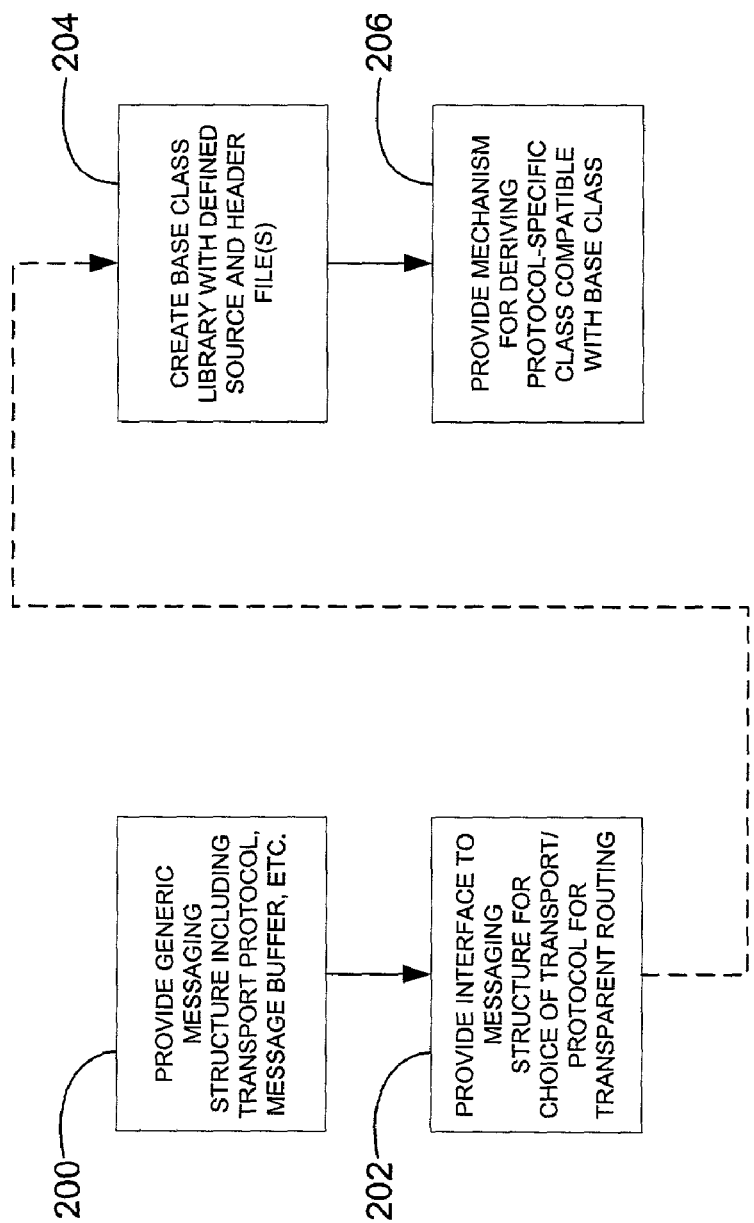
FIG. 2 is a flowchart illustrating the method of the invention in one of its embodiments.

FIG. 2 illustrates the invented method in the form of a flowchart. The method in accordance with a first embodiment includes a) at 200, providing a generic messaging structure that includes at least a transport protocol, a message buffer, a source-address fields and one or more data fields for transparent routing of a user protocol over the IP transport, and b) at 202, providing an application programming interface (API) to the generic messaging structure, the interface including a mechanism for a user to choose a desired transport and associated protocol for transparently routing the user protocol over the transport in accordance with the chosen transport protocol within the one or more data fields.

Still referring to FIG. 2, the method in accordance with a second embodiment includes c) at 204, creating a base class library including plural defined source and header files, and d) at 206, providing a mechanism for deriving a transaction-based protocol-specific class that is compatible with the base class library.

Those of skill in the art will appreciate that the two methods may be combined, as indicated by the dashed line between blocks 202 and 204 in FIG. 2, in accordance with a preferred embodiment of the invention described in detail below. Those of skill in the art also will appreciate that the methods may be implemented in alternative ways to those described in detail below, within the spirit and scope of the invention.

The MsgBuff library consists of a base C++ class named MsgBuff. The primary purpose of the base class is to provide a structured approach to defining a mechanism for tunneling any existing protocol over an IP transport. This is accomplished by deriving a new protocol-specific class from the base MsgBuff class and overriding appropriate structures and methods where necessary. First, the Msgbuf class will be described in detail. Second, an example of how a protocol class may be created using the MsgBuf class will be described.

The MsgBuff library consists of several C++ source and header files, to be described in detail below. Current implementations exist on the Solaris Sparc, Solaris x86 and Windows platform. As the source and header files conform to ANSI-specifications, the library can be compiled on any platform using an ANSI-compliant compiler.

The library was created specifically to tunnel Signaling System 7 (SS7) protocols across a pair of Unix Domain Protocol (UDP) sockets. However, it is designed more generally to provide tunneling/transport functionality using any industry- or user-defined protocol. For example, the library has been extended to support Telephone User Part (TUP) and Transaction Capabilities Application Part (TCAP). In addition, it has been used to derive a protocol, available from Cisco Systems, Inc., useful for controlling telephony bearer circuits. While these embodiments so far have been SS7- and telephony-centered protocols, the base MsgBuff class, within the spirit and scope of the invention, are extensible for use with any transaction-based protocol. Examples include Session Initiated Protocol (SIP), Simple Gateway Monitoring Protocol (SGMP), etc.

The following annotated C/C++ source code is further illustrative of message buffer data structure 12. Those of skill in the art will appreciate that the annotations are set off from the source code by the standard double-backslash (//) followed by the annotation

```
typedef struct buff {
    int protocolType;//Will be one of MsgBuffProtocolTypes
        enum
    long mtype; // Will be protocol specific msg type
    int seqNum;
    int mlength;
    int processId;
    short int offsetHash[MAX_HASH_VALUES];
    int numPayloadPresent; // How many TLVs are present
    char ipAddr[MAX_IP_ADDR_LENGTH];
    unsigned char mdata[MAX_DATA];
}msgBuffer;
```

Each of these fields will be described briefly below.

protocolType:
This field identifies the protocol of which this buffer is a part. A central enumeration is kept containing any defined protocols.

```
typedef enum {
    IsupSvc,
    TcapSvc, TupSvc,
    MediaSvc
}MsgBuffProtocolTypes;
``` mtype:
This field identifies the protocol-specific message contained within the buffer. Values for this field are typically an enumerated definition. For example:

```
typedef enum {
    tcapRegApp,
    tcapDeregApp,
    tcapQueryWithPermission,
    tcapQuereyWithoutPermission,
    tcapConversationWithPermission,
    tcapConversationWithoutPermission,
    tcapResponse,
    tcapUniDirectional
}TcapMsgTypes;
``` seqNum:
This field provides a basic sequencing mechanism for incoming and outgoing messages.

mlength:
This field indicates the overall length of the data buffer.

processId:
This field provides space to identify the identifier sending application.

offsetHash:
This field is used internally by the MsgBuff-derived classes to mark individual parameter units within the data array.

numPayloadPresent:
This field is a simple count of the encapsulated parameter data units within the data array.

ipAddr:
This identifies the IP address of the sending machine in a X.X.X.X format mdata:
This is the data buffer used for holding 0 or more protocol-specific data parameters. Its basic format is shown below:

| TAG | LENGTH | VALUE | TAG | LENGTH | VALUE | etc |

Each tag represents a protocol-specific, message-particular data parameter. The length of the parameter is defined by the length field, and the data structure itself is contained within the value field. Each tag-length-value (TLV) trio is placed as an entry one after the other within the mdata array. The beginning position of each trio is recorded in the offsetHash integer array. Up to forty total TLV trios can be defined for each buffer. Additionally, each derived child class may define multiple base TLV trios for the defined protocol. These trios would be present in all messages of that protocol type. The user protocol includes appropriate identifiers necessary for establishing user-user communication sessions. Examples might include SS7 linkset and CIC identifiers. The child class would then provide access methods that retrieve these always-present parameters from the buffer prior to accessing any non-mandatory parameters within the buffer.

The base MsgBuff class consists of base class constructors (virtual, copy, and assignment) and generic access methods for the private data. The main data component consists of a structure containing addressing, protocol, and message-specific parameters. Additionally, a variable length array is provided for transporting multiple protocol-specific data units. These units are used to form a TLV trio that is then inserted at the end of the data array within the buffer structure.

The following source code illustrates an ISUP message type and how easily a particular message type is enumerated in accordance with the invention.

```
typedef enum {
    regApp,
    deregApp,
    isupIam,
    isupAcm,
    etc.
} IsupMsgTypes;
```

The following source code illustrates a TCAP message type.

```
typedef enum {
    tcapRegApp,
    tcapDeregApp,
    tcapQueryWithPermission,
    tcapQueryWithoutPersimission,
    tcapConversationWithPermission,
    tcapConversationWithoutPermission,
    tcapResonse,
    tcapUniDirectional
} TcapMsgTypes;
```

The following source code illustrates a media access control (MAC) message type.

```
typedef enum {
    macRegApp,
    macDeregApp,
    macQtst,
    macCcot,
    macLpbk,
    macStop,
    macRsrv,
    macUsrv,
    macErrm,
    macApng,
    macVxml,
    macXfer,
    macXfrs,
} MacMsgTypes;
```

The following source code illustrates various payload types that would be carried as a TLV. Those of skill in the art will appreciate that they represent ISUP, TCAP and MAC tag values, in that order. The illustrated cic and linkset enumerations are examples of header information.

```
typedef enum {
    // The following would have their own access methods
    defined
        cic,
        linkset,
    // The rest would be accessed using the generic payload
    methods
        accessDelivery,
        backwardCallingIndicators,
        etc.
} IsupTagValues;

typedef enum {
    // These would be accessed using the generic payload
    methods
        tInfoEntity,
        dialogEntity,
        componentEntity
} TcapTagValues;

typedef enum {
    // The following would have their own access methods
    defined
        asmid,
        startCircuit,
        endCircuit,
        msgStatus,
        serviceState,
        iiDigit,
        uui,
    // The rest would be accessed using the generic payload
    methods
        errorMarg,
        ani,
        dnis,
        dest,
        macEntity1,
        macEntity2,
        etc.
} MacTagValues;
```

The following source code illustrates generic size definitions for message header and maximum message buffer size, in that order.

```
#define MSGHDRSIZE (sizeof(msgBuffer)-MAX_DATA)
#define MAX_MSGBUFF_SIZE (MSGHDRSIZE+MAX_DATA)
```

The following source code illustrates the base message buffer class and how straightforwardly API 10 permits certain parameters to be initialized or established, in the form of questions that might be asked of, or demands that might be placed on, the interface. In other words, the following source code illustrates in detail one implementation of the method blocks shown in FIG. 2. Those of skill in the art will appreciate that alternative implementations and equivalent methods are contemplated as being within the spirit and scope of the invention.

```
class MsgBuff
{
public:
    MsgBuff(msgBuffer*);
    virtual ~MsgBuff( );
```

The following source code illustrates how API 10 facilitates various functions including, for example, a determination of how many TLVs are in a message, which protocol is represented by a message and what the message control is.

```
// How many TLVs are there?
inline getNumPayload( ) const
{return(buff.numPayloadPresent);}
// Get the raw msgBuffer structure.
inline msgBuffer*getBuffer( )
{return(&buff);}
// What kind of protocol does this buffer represent?
inline void setProtocol(int type)
{buff.protocolType=type;}
inline int getProtocol( )
{return( )buff.protocolType);)
//What kind of ISUP, TCAP, MAC, etc message in this?
//Could be isuplam, tcapUniDirectional, macCcot, etc.
inline int getMsgType( ) const
{return(buff.mtype);}
inline int getProcessId( ) const
{return(buff.processId);}
inline void setProcessId(int id)
{buff.processID=id;}
inline void setIpAddr(char*addr)
{strncpy(buff.ipAddr,   addr,   MAX_IP_AD-
    DR_LENGTH);}
inlinechar*getIpAddr( ) const
{return(buff.ipAddr);}
inline void setSeqNum(int i)
{buff.seqNum=i;}
inline int getSeqNum( ) const
{return(buff.seqNum);}
// Pure virtual parent functions
virtual void addPayload(int type, void*payload, int size)
=0;
virtual int getPayload(int index, void** returned Payload-
Pointer)=0;
virtual int getPayloadType(int index)=0;

private:
    msgBuffer buff;
    int tlvOffset;

};
```

The following source code illustrates a typical Child ISUP message buffer class.

```
class IsupMsgBuff : public MsgBuff
{
public:
    IsupMsgBuff(unsigned int type, unsigned int ls,
            int circuitId1, circuitId2 = 0);
        // Here, 'type' might be isupIam, isupRel, etc.
    IsupMsgBuff(msgBuffer *);
    inline unsigned int getLinkSet( ) const
    {
        int val;
        memcpy((void *)val,
            (void *)(buff.mdata + LS_OFFSET,
            SIZE_OF_INT);
        return(val);
    };
```

```
    inline void setResponse(bool resp)
    {
        (void *)&resp,
        SIZE_OF_BOOL);
        buff.mlength += SIZE_OF_BOOL;
    };
    // Same kind of thing for getResponse
    // ISUP parameter specific methods
    int getParmType(int) const;
    int getParam(int, auto_ptr<Param> &) const;
    void addParam(auto_ptr<Param> &);
    void addParam(int, ParameterTransportStrtict **);
    void setMsgSpecifics(unsigned int type,
            unsigned int linkset,
            int circuitId1,
            int circuitId2 = 0);
    // Parent virtual functions defined for child
    // In ISUP implementation may instead of the following use
    the existing
    //addParam, getParmType, and getParam methods
    void addPayload(int type, void *payload, int size);
    int getPayload(int index, void **payload);
    int getPayloadType(int index);
```

The following source code illustrates a typical Child TCAP message buffer class.

```
class TcapMsgBuff : public MsgBuff
{
public:
    TcapMsgBuff(msgBuffer *);
    TcapMsgBuff(int packageType);
    // TCAP parameter specific methods
    inline unsigned int getPackageType( ) const
    {
        int val;
        memcpy((void *)val,
            (void *)(buff.mdata + PKGTYPE_OFFSET,
            SIZE_OF_INT);
        return(val);
    };
    // The tInfo, dialog, and component pieces would be added to
    the buffer
    // using the payload access methods below
    // Parent virtual functions defined for child
    void addPayload(int type, void *payload, int size);
    int getPayload(int index, void **payload);
    int getPayloadType(int index);
private:
}
```

The following source code illustrates a typical Child MAC message buffer class.

```
class MacMsgBuff : public MsgBuff
{
public:
    MacMsgBuff(msgBuffer *);
    MacMsgBuff(unsigned int opCode, int asmId,
            short status, short serviceState,
            short iidigit, short uui,
            short startCircuit, short endCircuit = 0);
```

-continued

```
// Here 'opCode' would be macQtst, macCcot, etc.
// MAC parameter specific methods
inline short getAsmId( ) const
{
    short val;
    memcpy((void *)val,
        (void *)(buff.mdata + ASMIID_OFFSET,
        SIZE_OF_SHORT);
    return(val);
};
// Other parameter access methods would follow, similar to getAsmId
// Could also add set methods for each if needed
// The ani, dnis, and dest items would be added as TLVs using
// the addPayload method
// The error message char array that is part of the
// MacMsg structure would be another TLV
// Parent virtual functions defined for child.
// in the MAC case, these can be stubbed.
void addPayload(int type, void *payload, int size);
int getPayload(int index, void **payload);
int getPayloadType(int index);
private:
}
```

The following source code illustrates the creation of message buffers.

MsgBuff EXAMPLES

Outgoing TCAP Message

TcapMsgBuff*tcapMb=new TcapMsgBuff(tcapQueryWithPermission);
tcapMb→addPayload(tInfoEntity, &InforStruct, sizeof(TInforStruct));
tcapMb→addPayload(componentEntity, &firstComponentStruct,
    sizeof(ComponentStruct);
tcapMb→addPayload(componentEntity, &secondComponentStruct,
    sizeof(ComponentStruct);
tcapMb→addPayload(dialogEntity, &dialogStruct, sizeof(DialogStruct));
msgBuffer*buff=tcapMb→getBuffer( );
retCode=socket→send((void*)&buff, MSGHDRSIZE+buff→mlength);

Outgoing ISUP Message

IsupMsgBuff*isupMb=newIsupMsgBuff(isupIam, ls, cic);
auto_ptr<Param>parm(creator→CreateParam(forwardCallingIndicators));
isupMb→addParam(parm);
msgBuffer*buff=isumMb→getBuffer( );
retCode=socket→send((void*)&buff, MSGHDRSIZE+buff→mlength);

Outgoing MAC Message

MacMsgBuff*macMb=new MacMsgBuff(macQtst, asmId, status, serviceState,
    iidigit, uui, startCircuit);
macMb→addPayload(ani, &aniStruct, sizeof(AniStruct));
macMb→addPayload(dnis, &dnisStruct, sizeof(DnisStruct));
msgBuffer*buff=macMb→getBuffer( );
retCode=socket→send((void*)&buff, MSGHDRSIZE+buff→mlength);

Incoming Generic Message

```
msgBuffer incomingBuffer;
retCode = socket->read((void*)&incomingBuffer, MAX_MSGBUFF_SIZE);
MsgBuff*b = new MsgBuff(&incomingBuffer);
switch(b->getProtocol( ))
{
    case TcapSrv:
    {
        msgType = b->getMsgType( ); //Would be something like
            //tcapUniDirectional
        entityType = b->getPayload(0, &tInfoStruct);// Assumes tinfo is
                                                    //the first payload
                                                    //item
        for(int idx = 1; idx<MAX_COMPONENTS_ALLOWED; idx++)
        {
            type = b->getPayloadType(idx);   // Something like
                        // dialogEntity or
                        // componentEntity
            switch(type)
            {
                case componentEntity:
                    retCode = b->getPayload(idx,
                        componentStruct);
                    break;
                case dialogEntity:
                    retCode = b->getPayload(idx, dialogStruct);
                    break;
            }
        }
        break;
    }
    case IsupSrv:
    {
        msgType = b->getMsgType( ); // Would be something like isupIam
        ls = b->getLinkSet( );
        cic1 = b->getCic( );
        cic2 = b->getCicRangeEnd( );
        for(int idx = int(0), type = b->getParmType(idx);
            type !=-1;
            type = b->getParmType(++idx))
        {
            auto_ptr<Param>prm(creator->CreateParam(type));
            retCode = b->getParam(idx, prm);
        }
        break;
    }
    case MediaSrv:
    {
        msgType = b->getMsgType( ); // Would be something like macQtst
        asmId = b->getAsmId( );
        for(int idx = 0 idx < MAX_HASH_VALUES; idx++)
        {
            switch(b->getPayloadType(idx))
            {
                case errorMsg:
                    retCode = b->getPayload(idx, errorStruct);
                    break;
                case ani:
                    retCode = b->getPayload(idx, aniStruct);
                    break;
                etc...
            }
        }
        break;
    }
}
```

The following source code illustrates the enumeration of the various illustrative MsgBuff protocol types including ISUP, TCAP, TUP, MEDIA and FOO, in that order.

```
typedef enum
{
  IsupSvc,
  TcapSvc,
  TupSvc,
  MediaSvci,
  Foo
} MsgBuffProtocolTypes;
```

Child Class Derivation

When a new protocol is to be created, the MsgBuff object is used to derive the protocol-specific child class. For instance, the base MsgBuff class may be used to create a ISDN User Part (ISUP) child IsupMsgBuff class that is used to transport SS7 ISUP messages over UDP sockets. Each child class receives base class functionality that supports protocol identification, message type specification, and addressing information. These are not to be overridden by the child class. In addition, the base class specifies several virtual methods that must be overridden by the protocol-specific child class. These methods are primarily data-related and are customized to support the new protocol.

An example of a generic 'FOO' protocol implementation is presented below:

```
typedef enum {
  firstParameter,
  sceondParameter,
  thirdParameter,
} FooTagValues;

typedef enum {
  fooMessage1,
  fooMessage2,
  fooMessage 3,
}FooMsgTypes;

class FooMsgBuff:public MsgBuff
{
public:
  FooMsgBuff(msgBuffer*);
  FooMsgBuff(int packageType);
  // Example FOO parameter specific method
  inline unsigned int getPackageType( ) const
  {
  int val;
  memcpy((void*)val,    (void*)(buff.mdata+PKGTY-
      PE_OFFSET), SIZE_OF_INT);
  return(val);
  };
  //Parent virtual functions define for child FOO
  void addPayload(int type, void*payload, int size);
  int getPayload(int index, void**payload);
  int getPayloadType(int index);

private:
};
```

MsgBuff EXAMPLES

These examples show how various protocol messages can be created using the MsgBuff-derived protocol classes for transport over a generic UNIX socket.

Outgoing FOO Message

```
// Create a new FOO-specific MsgBuff object of message
type fooMessage1
  FooMsgBuff*fooMb=new FooMsgBuff(fooMessage1);
  // Add various FOO-specific structures to the base MsgBuff
data buffer
  foo Mb→addPayload(firstParameter, &firstParmStruct,
sizeof(FirstParmStruct));
  fooMb→addPayload(secondParameter, &secondCompo-
nentStruct,
    sizeof(SecondComponentStruct));
  fooMb→addPayload(thirdParameter, &thirdComponent-
Struct ,
    sizeof(ThirdComponentStruct));
  // Extract the buffer transport structure and send over the
outgoing UNIX socket
  msgBuffer*buff=fooMb→getBuffer( );
  retCode=socket→send((void*)&buff,  MSGHDRSIZE+
buff→mlength);
```

Incoming FOO Message

This code example shows how an application can receive and decode an incoming generic MsgBuffer data array received over a UNIX socket:

```
msgBuffer incomingBuffer;
// Receive the data from the inbound socket
retCode = socket->read((void *)&incomingBuffer,
MAX_MSGBUFF_SIZE);
// Create a generic MsgBuff object with the received data
MsgBuff *b = new MsgBuff(&incomingBuffer);
// Determine the protocol of the received message
switch(b->getProtocol( ))
{
  case Foo:
  {
    // Get the message type of the inbound data
    // Will be something like fooMessage1 or fooMessage2
    msgType = b->getMsgType( );
    for(int idx = 1; idx <b->getNumPayload ( ); idx++)
    {
      type = b->getPayloadType(idx);    // Something like
                                        // firstParameter or
                                        // secondParameter
      switch(type)
      {
        case firstParameter:
          // Read the data into the indicated structure
          retCode = b->getPayload(idx,
            &firstParmStruct);
          break;
        case secondParameter:
          retCode = b->getPayload(idx,
            &secondParmStruct);
          break;
        case thirdParameter:
          retCode = b->getPayload(idx,
            &thirdParmStruct);
          break;
      }
    }
    break;
  }
  case...    // Other cases defined for any potential incoming protocol
}
```

Table I immediately below illustrates the ISUP message types that may be enumerated in accordance with one embodiment of the invention.

TABLE I

| ISUP Message | IsupMsgTypes Enumeration |
|---|---|
| Address Complete Message | isupAcm |
| Answer Message | isupAnm |
| Blocking Acknowledgement | isupBla |
| Blocking Message | isupBlo |
| Call Modification Completed | isupCmc |
| Call Modification Rejected | isupCmrj |
| Call Modification Request | isupCmr |
| Call Progress Message | isupCpg |
| Charge Information Message | isupCrg |
| Circuit Query Message | isupCqm |
| Circuit Query Response | isupCqr |
| Circuit Reservation Acknowledgement | isupCra |
| Circuit Reservation Message | isupCrm |
| Circuit Validation Response | isupCvr |
| Circuit Validation Test | isupCvt |
| Confusion Message | isupCfn |
| Connect Message | isupCon |
| Continuity Check Request | isupCcr |
| Continuity Message | isupCot |
| Facility Accepted Message | isupFaa |
| Facility Information Message | isupFai |
| Facility Message | isupFac |
| Facility Rejected Message | isupFrj |
| Facility Request Message | isupFar |
| Forward Transfer Message | isupFot |
| Information Message | isupInf |
| Information Request Message | isupInr |
| Initial Address Message | isupIam |
| Loopback Acknowledgement | isupLpa |
| Pass Along Message | isupPam |
| Release Complete Message | isupRlc |
| Release Message | isupRel |
| Reset Circuit Message | isupRsc |
| Resume Message | isupRes |
| Subsequent Address Message | isupSam |
| Suspend Message | isupSus |
| Unblocking Acknowledgement | isupUba |
| Unblocking Message | isupUbl |
| Unequipped Circuit Identification Code Message | isupUcic |
| User To User Information | isupUsr |

Table II immediately below illustrates various parameter types and tags that may be enumerated for ISUP messages in accordance with one embodiment of the invention.

TABLE II

| Parameter Type | IsupParmTag Enumeration | Valid For Message Type |
|---|---|---|
| Access Delivery | accessDelivery | ACM |
| Access Transport | accessTransport | IAM, INF, ACM, ANM, REL, CPG, USR |
| Automatic Congestion Level | autoCongestionLvl | REL |
| Backward Call Indicators | backwardCallingIndicators | ACM, ANM, CPG |
| Business Group | businessGroup | IAM, INF, ACM, ANM, CPG |
| Call Diversion Information | callDiversionInfo | ACM |
| Call Modification Indicator | callModificationIndicators | CMR, CMC, CMRJ |
| Call Reference | callReference | IAM, INR, INF, ACM, CON, FOT, ANM, REL, SUS, RES, CMR, CMC, CMRJ, FAR, FAA, FRJ, DRS, CPG, USR |
| Called Party Number | calledPartyNumber | IAM, INE |
| Calling Party Number | callingPartyNumber | IAM |
| Calling Party's Category | callingPartysCategory | IAM, INF |
| Carrier Identification | carrierIdentification | IAM |
| Carrier Selection Information | carrierSelectionInfo | IAM |
| Cause Indicator | causeIndicator | ACM, REL, FRJ, CPG, CFN |
| Charge Number | chargeNumber | IAM, INF, REL |
| Circuit Group Characteristics Indicator | circuitGroupCharacteristicsInd | CVR |
| Circuit Assignment Map | circuitAssignmentMap | IAM, CQM |
| Circuit Identification Name | circuitIdentificationName | CVR |
| Circuit State Indicator | circuitStateIndicators | CQM, CQR |
| Circuit Validation Response Indicator | circuitValidationResponse | CVR |
| Common Language Location Id | clli | CVR |
| Connected Number | connectedNumber | CON |
| Connection Request | connectionRequest | IAM, INR, INF, ACM, CON, ANM |
| Continuity Indicators | continuityIndicators | COT |
| CUG Interlock Code | cugInterlockCode | IAM |
| Echo Control Information | echoControl | ACM |
| Egress Service | egressService | IAM |
| Event Information | eventInformation | CPG |
| Facility Indicator | facilityIndicators | FAR, FAA, FRJ |
| Forward Call Indicators | forwardCallingIndicators | IAM |
| Generic Address | genericAddress | IAM, REL |
| Generic Name | genericName | IAM |
| Generic Notification Indicator | genericNotifInd | IAM, ACM |
| Generic Number | genericNumber | IAM |
| Generic Reference | genericReference | IAM |
| Hop Counter | hopCounter | IAM |
| Information Indicators | informationIndicators | INF, ACM, ANM, CPG |
| Information Request Indicators | informationRequestIndicators | IAM, INR |
| Jurisdiction Information | jurisdictionInfo | IAM |
| Location Number | locationNumber | IAM |
| MLPP Precedence | mlppPrecedence | IAM |
| Nature Of Connection Indicators | natureOfConnectionIndicators | IAM, CRM |
| Network Specific Facility | networkSpecFacil | IAM, INR, ACM |
| Network Transport | networkTransport | IAM, INR, ACM, ANM, CPG |
| Notification Indicators | notificationIndicators | ACM, CPG |

The following source code illustrates a driver that may be used to create, send and read a message over a socket.

```
#include <iostream>
#include "TupMsgBuff.h"
#include "TupParam.h"
#include "Socket.h"
using namespace std;
int
main(int argc, char **argv)
{
```

-continued

```
        // First, create a new MsgBuff of some msg type and put a couple of
        // parameters in it
        int linkset = 1;
        int cic = 1;
        TupMsgBuff *t = new TupMsgBuff(tupIam, linkset, cic);
        // These are all the available TUP parameters
        IAMMessageInd imi;
        AddrSigs as;
        LineID li;
        ClosedUserGroup cug;
        AnswerType at;
        Respind ri;
        MsgInd mi;
        TupAutoCongLvl acl
        TrunkID ti;
        ChargeInfo ci;
        Cause C;
        PointCode pc;
        Range r;
        t->addParam(tupIamMsgInd, (void *)&imi,
        SIZE_OF_IAM_MSG_IND);
        t->addParam(tupClosedUserGroup, (void *)&cug,
SIZE_OF_CLOSED_USER_GROUP);
        t->addParam(tupLineId, (void *)&li, SIZE_OF_LINE_ID);
        msgBuffer *mb;
        mb = t->getBuffer( );
        socket->sendMsg((char *)mb,
                mb->mlength + MSGHDRSIZE,
                someIpAddr,
                somePort);
        // Now clean up the object
        delete t;
// Now assume a new message has come in over a socket
msgBuffer receiveMb;
ret = socket ->receiveMsg(&address, (char *) &receiveMb,
MAX MSGBuff SIZE);
IF (RECEIVEmB.PROTOCOLtYPE == tUPsVC)
{
// Create a new TupMsgBuff object using the received data
t = new TupMsgBuff(&receivedMb);
cic = t->getCic( );
int cicEnd = t->getCicRangeEnd( );
linkset = t->getLinkSet( );
// Now find out what type of message it is
int msgType = t->getMsgType( );
switch(msgType)
{
    case tupIam:
        printf("got IAM\n");
        break;
    case tupGrs:
        printf("got GRS\n");
        break;
    default:
        printf("Unknown msg type\n");
        break;
}
// And finally, get the parameter structures out of the received buffer
int parmType;
ParameterTransportStruct *p;
    for(int index = 0, type = t->getParmType(0);
            type !=-1;
            type = t->getParmType(++index))
    {
        parmType = t->getParmStruct(index, &p);
        switch(parmType)
        {
            case tupIamMsgInd:
                printf("Got IAM Msg Ind structure\n");
                break;
            case tupClosedUserGroup:
                printf("Got ClosedUserGroup structure\n");
                break;
            case tupLineId:
                printf("Got Line ID\n");
                break;
            default:
                printf("Error\n");
                break;
        }
    }
}
    delete t;
    exit(0);
}
```

Figure 3:
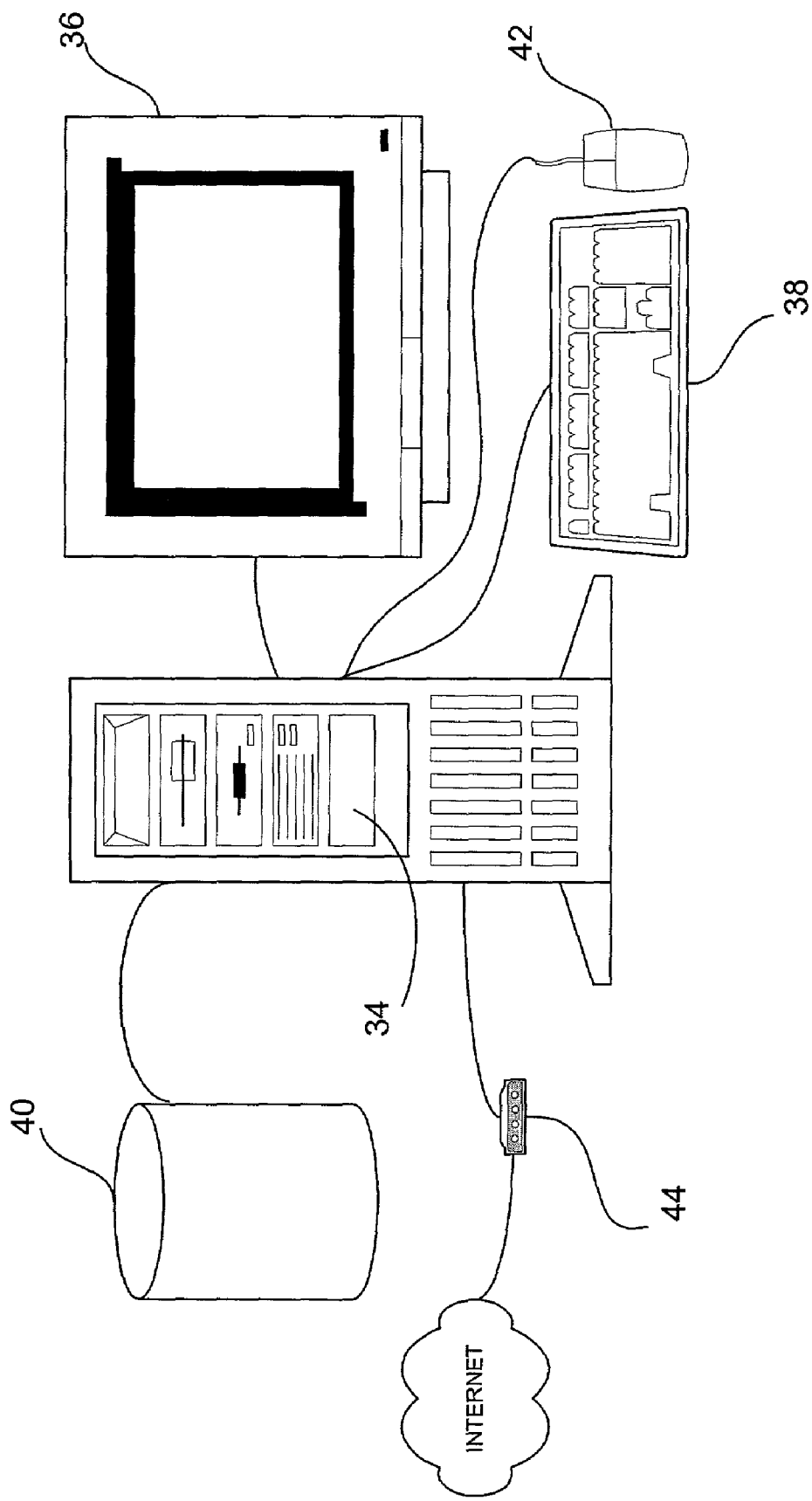
FIG. 3 is a system block diagram representing a computer system used to create the invented interface of FIG. 1 and to implement the method of FIG. 2.

FIG. 3 is a system block diagram illustrating how API 10 and the above-described method and apparatus may be implemented. FIG. 3 shows a workstation or personal computer (PC) 34 equipped with a monitor 36, a keyboard 38, a hard drive 40, a mouse or other cursor control device 42 and a modem 44 connected to the Internet. Those of skill in the art will appreciate that PC 34 suitably programmed as described above provides a user with above-described applications program interface 10 and also implements the invented methods by which a data-related protocol is tunneled through a generic IP transport.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A method of tunneling a transaction based protocol through a generic Internet protocol (IP) transport, the method comprising:
   providing a generic messaging structure that includes a transport protocol, a message buffer, a source-address field and one or more data fields for transparent routing of a user protocol over the IP transport during a host-to-host communication or telecommunication session;
   providing an application program interface to the generic messaging structure, the application program interface including a mechanism for a user to choose a desired transport and associated protocol for transparently routing the user protocol over the desired transport in accordance with the chosen transport protocol within the one or more data fields;
   creating a base class library including plural defined source and header files, and
   providing a mechanism for deriving a transaction-based protocol-specific class that is compatible with the base class library, the transaction-based protocol-specific class further being derived based in part on the chosen transport protocol.

2. The method of claim 1, wherein the transaction-based protocol-specific class is derived using an object-oriented inheritance based mechanism.

3. The method of claim 1 including compiling the transaction-based protocol-specific class when a transaction and the transport protocol are determined.

4. The method of claim 1 wherein the transport protocol is operated on by a signaling function and wherein the user protocol may be routed over the transport without a switching function.

5. The method of claim 1 including populating a message structure of the transaction-based protocol-specific class with tag-length-value (TLV) trios when the transaction-based protocol-specific class is derived.

6. A method of tunneling any related data-, control-, or routing-related protocol through a generic Internet protocol (IP) transport, the method comprising:
creating a base class library including plural defined source and header files, the base class library further including base class constructors of virtual, copy, and assignment, and generic access methods;
choosing a transport protocol for transparently routing a user protocol over the IP transport; and
providing a mechanism for deriving a transaction-based protocol-specific class that is compatible with the base class library, the transaction-based protocol-specific class further being derived based in part on the chosen transport protocol, wherein the transaction-based protocol-specific class is derived in using an object-oriented inheritance based mechanism.

7. The method of claim 6 which further comprises:
providing a generic messaging structure that includes the transport protocol, a message buffer, a source-address field and one or more data fields for transparent routing of the user protocol over the IP transport during a host-to-host communication or telecommunication session.

8. The method of claim 6 which further comprises:
providing an application program interface to a generic messaging structure, the interface including a mechanism for a user to choose a desired transport and associated protocol for transparently routing the user protocol over the transport in accordance with the chosen transport protocol within the generic messaging structure.

9. A method of tunneling any related data-, control-, or routing-related protocol through a generic Internet protocol (IP) transport, the method comprising:
creating a base class library including plural defined source and header files, the base class library further including base class constructors of virtual, copy, and assignment, and generic access methods;
providing a mechanism for deriving a transaction-based protocol-specific class that is compatible with the base class library, the transaction-based protocol-specific class further being derived based in part on the chosen transport protocol;
providing an application program interface to a generic messaging structure, the interface including a mechanism for a user to choose the transport protocol; and
providing a generic messaging structure that includes the transport protocol, a message buffer, a source-address field and one or more data fields for transparent routing of a user protocol over the IP transport during a host-to-host communication or telecommunication session.

10. A computer-readable medium including an application programming interface stored on the computer-readable medium for transparently routing data between hosts in an Internet protocol (IP) transport, comprising:
a message buffer data structure defining a protocol-generic parent class, message, source-address and data fields for a chosen transport protocol;
a message creation mechanism for creating a message and adding it to the message buffer data structure; and
a protocol creation mechanism for deriving a protocol-specific child class based on the chosen transport protocol that renders new protocol-specific sub-fields of the protocol field of the message buffer data structure, where the application programming interface includes a mechanism for a user to choose a desired transport and associated protocol for transparently routing a user protocol over the transport in accordance with the chosen transport protocol within the generic messaging structure.

11. The computer-readable medium of claim 10 in which the protocol-specific child class is derived using an object-oriented inheritance based mechanism.

12. The computer-readable medium of claim 11, wherein the message creation and protocol creation mechanisms include computer-readable and computer-executable software instructions.

13. The computer-readable medium of claim 12, including software source code and headers in C/C++ programming language form.

14. A computer-readable medium containing a program for tunneling a transaction based protocol through a generic Internet protocol (IP) transport, wherein when the program is executed by at least one device it is operable to:
provide a generic messaging structure that includes a transport protocol, a message buffer, a source-address field and one or more data fields for transparent routing of a user protocol over the IP transport during a host-to-host communication;
provide an application program interface to the generic messaging structure, the application program interface including a mechanism for a user to choose a desired transport and associated protocol for transparently routing the user protocol over the desired transport in accordance with the chosen transport protocol within the one or more data fields;
create a base class library including plural defined source and header files, and
provide a mechanism for deriving a transaction-based protocol-specific class that is compatible with the base class library, the transaction-based protocol-specific class further being derived based in part on the chosen transport protocol.

15. A computer-readable medium containing a program for tunneling a data-related protocol through a generic Internet protocol (IP) transport, wherein when the program is executed by at least one device it is operable to:
create a base class library including plural defined source and header files, the base class library further including base class constructors of virtual, copy, and assignment, and generic access methods;
choose a transport protocol for transparently routing a user protocol over the IP transport; and
provide a mechanism for deriving a transaction-based protocol-specific class that is compatible with the base class library, the transaction-based protocol-specific class further being derived based in part on a chosen transport protocol, wherein the transaction-based protocol-specific class is derived using an object-oriented inheritance based mechanism.

16. The computer-readable medium in accordance with claim 15, wherein the program is further operable to:

provide an application program interface to a generic messaging structure, the interference including a mechanism for a user to choose a desired transport and associated protocol for transparently routing a user protocol over the transport in accordance with the chosen transport protocol within the generic messaging structure.

17. The computer-readable medium in accordance with claim 15, wherein the program is further operable to:

provide a generic messaging structure that includes the transport protocol, a message buffer, a source-address field and one or more data fields for transporting routing of a user protocol over the IP transport during a host-to-host communication or telecommunication session.

* * * * *

UNITED STATES PATENT AND TRADEMARK OFFICE
CERTIFICATE OF CORRECTION

PATENT NO. : 7,395,343 B1
APPLICATION NO. : 10/083891
DATED : July 1, 2008
INVENTOR(S) : Jay Baker It is certified that error appears in the above-identified patent and that said Letters Patent is hereby corrected as shown below:

At column 2, line 9, please delete "linked" and insert -- linkset --, therefor.

At column 2, line 28, please delete "SCMP" and insert -- SGMP --, therefor.

At column 2, line 67, please delete "fields" and insert -- field --, therefor.

At column 3, line 29, please delete "Msgbuf" and insert -- MsgBuff --, therefor.

At column 3, line 31, please delete "MsgBuf" and insert -- MsgBuff --, therefor.

At column 4, line 26, please delete "Querey" and insert -- Query --, therefor.

At column 5, line 26, please delete "isuplam," and insert -- isuplam --, therefor.

At column 5, line 38, please delete "Persimission" and insert -- Permission --, therefor.

At column 5, line 41, please delete "Resonse" and insert -- Response --, therefor.

At column 6, line 35, please delete "Marg" and insert -- Msg --, therefor.

At column 6, line 62, please delete "classMsgBuff" and insert -- class MsgBuff --, therefor.

At column 7, line 4, please delete "control" and insert -- content --, therefor.

At column 7, line 17, please delete "{return()buff.protocolType);)" and insert -- {return(buff.protocolType);} --, therefor.

At column 7, line 18, please delete "in" and insert -- is --, therefor.

At column 7, line 19, please delete "isuplam," and insert -- isuplam --, therefor.

At column 7, line 26, please delete "processID" and insert -- processId --, therefor.

UNITED STATES PATENT AND TRADEMARK OFFICE
CERTIFICATE OF CORRECTION

PATENT NO. : 7,395,343 B1
APPLICATION NO. : 10/083891
DATED : July 1, 2008
INVENTOR(S) : Jay Baker It is certified that error appears in the above-identified patent and that said Letters Patent is hereby corrected as shown below:

At column 7, line 30, please delete "inlinechar" and insert -- inline char --, therefor.

At column 7, lines 40-41, please delete "returned Payload" and insert -- returnedPayload --, therefor.

At column 8, line 16, please delete "Strtict" and insert -- Struct --, therefor.

At column 9, line 9, please delete "ASMIID" and insert -- ASMID --, therefor.

At column 9, lines 33-34, please delete "InforStruct, sizeof(TInforStruct)" and insert -- tInfoStruct, sizeof(TInfoStruct) --, therefor.

At column 9, line 37, please delete ");" and insert -- )); --, therefor.

At column 9, line 40, please delete ");" and insert -- )); --, therefor.

At column 9, line 49, please delete "Is," and insert -- Is --, therefor.

At column 9, line 54, please delete "isum" and insert -- isup --, therefor.

At column 10, line 17, please delete "tinfo" and insert -- tInfo --, therefor.

At column 11, line 7, please delete "Svci" and insert -- Svc --, therefor.

At column 11, line 30, please delete "sceond" and insert -- second --, therefor.

At column 11, line 31, please delete "thirdParameter," and insert -- thirdParameter --, therefor.

At column 11, line 55, please delete "define" and insert -- defined --, therefor.

At column 12, line 8, please delete "foo Mb" and insert -- fooMb --, therefor.

UNITED STATES PATENT AND TRADEMARK OFFICE
CERTIFICATE OF CORRECTION

PATENT NO. : 7,395,343 B1
APPLICATION NO. : 10/083891
DATED : July 1, 2008
INVENTOR(S) : Jay Baker It is certified that error appears in the above-identified patent and that said Letters Patent is hereby corrected as shown below:

At column 14 (Table II), line 8, column 3, please delete "INE" and insert -- INF --, therefor.

At column 15, line 13, please delete "Respind" and insert -- Resplnd --, therefor.

At column 15, line 14, please delete "acl" and insert -- acl; --, therefor.

At column 15, line 17, please delete "C" and insert -- c --, therefor.

At column 17, line 29 of Claim 6, after "derived" delete "in".

At column 19, line 4 of Claim 16, delete "interference" and insert -- interface --, therefor.

At column 20, line 5 of Claim 17, delete "transporting" and insert -- transparent --, therefor.

Signed and Sealed this

Twenty-sixth Day of May, 2009

JOHN DOLL
*Acting Director of the United States Patent and Trademark Office*